United States Patent
Mizuguchi et al.

(10) Patent No.: US 7,419,413 B2
(45) Date of Patent: Sep. 2, 2008

(54) OUTBOARD MOTOR SHIFT CONTROL SYSTEM

(75) Inventors: Hiroshi Mizuguchi, Wako (JP); Hideaki Takada, Wako (JP); Shinsaku Nakayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 355 days.

(21) Appl. No.: 11/376,931

(22) Filed: Mar. 16, 2006

(65) Prior Publication Data

US 2006/0213301 A1    Sep. 28, 2006

(30) Foreign Application Priority Data

Mar. 22, 2005   (JP)   ............................. 2005-081113

(51) Int. Cl.
*B63H 21/22* (2006.01)
(52) U.S. Cl. .......................................... 440/84; 440/86
(58) Field of Classification Search ................. 440/1, 440/2, 61 S, 75, 84, 86, 87; 701/21
See application file for complete search history.

(56) References Cited

U.S. PATENT DOCUMENTS 5,080,619 A * 1/1992 Uchida et al. .................. 440/84
6,485,340 B1 * 11/2002 Kolb et al. .................... 440/84

FOREIGN PATENT DOCUMENTS

JP    2004-218812    8/2004

* cited by examiner

*Primary Examiner*—Lars A Olson
(74) *Attorney, Agent, or Firm*—Carrier, Blackman & Associates, P.C.; Joseph P. Carrier; William D. Blackman (57) ABSTRACT

In an outboard motor shift control system to change the shift position by controlling the supply of current to an electric shift motor for driving a shift mechanism, a detent mechanism is equipped for constraining the operation of the shift mechanism and holding the shift position once the shift position has been established, and the supply of current to the shift motor is discontinued upon detection that the shift position has been established. This configuration makes it possible to minimize the power consumption of the shift motor and ensure secure holding of the established shift position.

5 Claims, 9 Drawing Sheets

OUTBOARD MOTOR SHIFT CONTROL SYSTEM

BACKGROUND OF THE INVENTION

1. Field of the Invention

This invention relates to an outboard motor shift control system.

2. Description of the Related Art

Japanese Laid-Open Patent Application No. 2004-218812 (particularly paragraphs 0034 to 0045), for example, teaches a system that changes the shift (gear) position of an outboard motor by using an electric actuator to operate a shift mechanism. In this system, a shift rod connected with a clutch is rotated by the output of the electric actuator to move the clutch to a selected position among one where it engages a forward gear, one where it engages a reverse gear and one where it does not engage either of these gears, thereby making it possible to establish the shift position to any of neutral, forward and reverse.

Secure holding of an established shift position requires prevention of unintended clutch movement. In the aforesaid prior art system, therefore, the electric actuator needs to be kept energized so as to continue producing driving force not only when the shift position is being changed but even during holding of the established shift position. This poses a problem of high electric power consumption.

SUMMARY OF THE INVENTION

An object of this invention is therefore to overcome this problem by providing an outboard motor shift control system that reduces the power consumption of the electric actuator for driving the shift mechanism and securely holds the established shift position.

In order to achieve the object, this invention provides a system for controlling shift change of an outboard motor mounted on a stern of a boat among positions including a forward position, a reverse position and a neutral position, comprising: an electric actuator driving a shift mechanism of the outboard motor that changes the shift position; a current controller controlling supply of current to the actuator to operate the shift mechanism; a shift position holder holding the shift position once established; and a detector detecting whether one of the shift positions has been established; wherein the current controller discontinues the supply of current to the actuator when it is detected that the shift position has been established.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

An outboard motor shift control system according to an embodiment of the present invention will now be explained with reference to the attached drawings.

Figure 1:
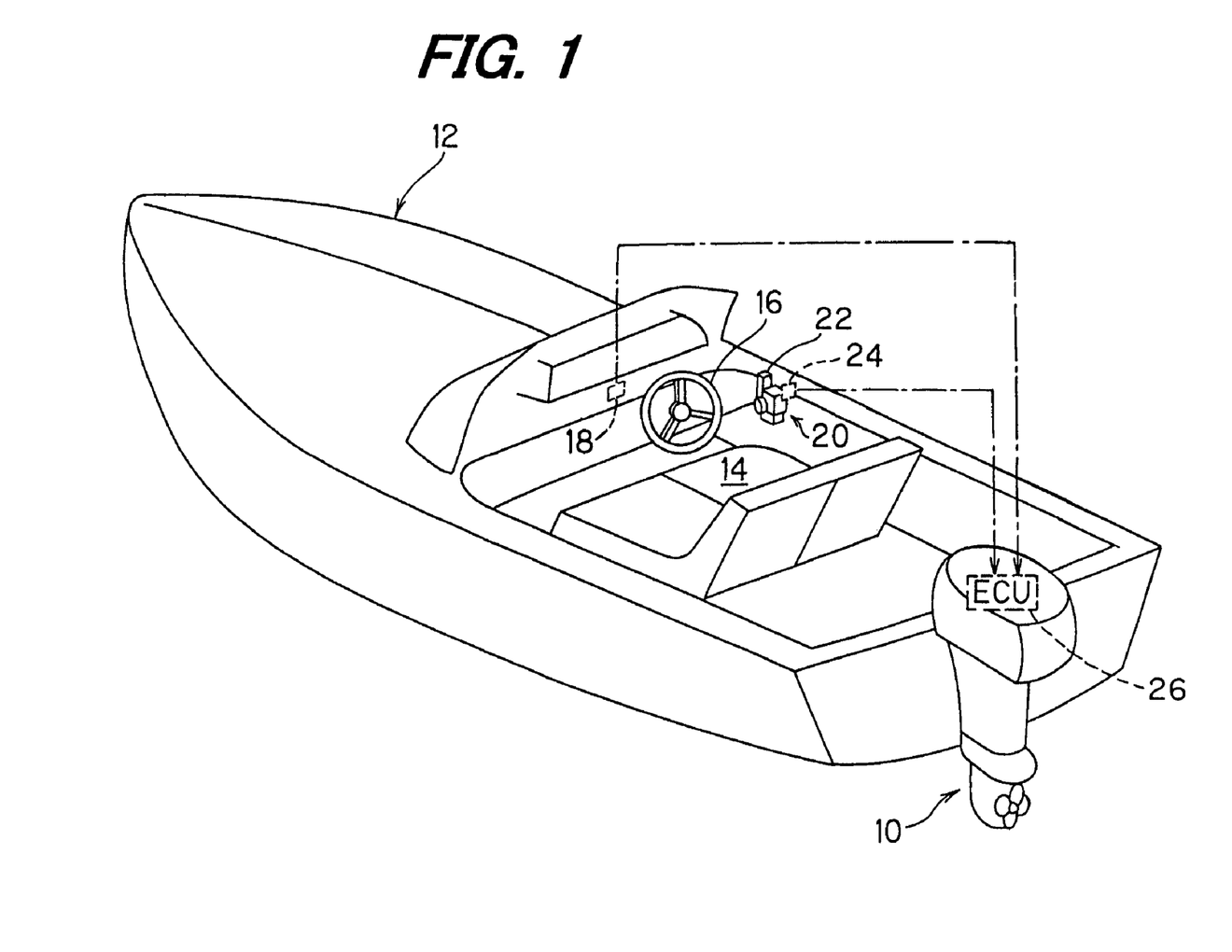
FIG. 1 is an overall schematic view of an outboard motor shift control system, including a boat (hull), according to an embodiment of the invention.
Figure 2:
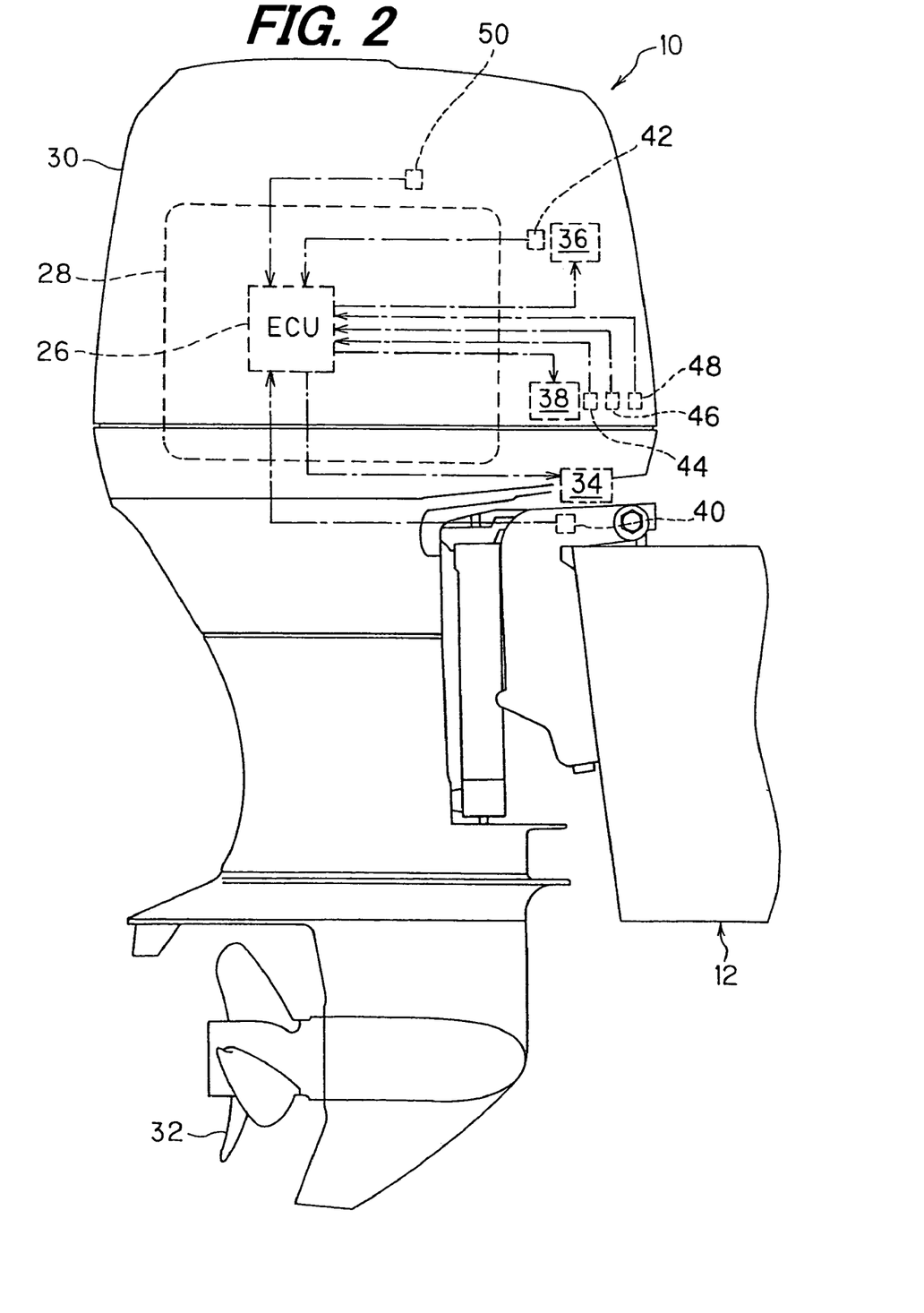
FIG. 2 is an enlarged side view of the outboard motor shown in FIG. 1.

FIG. 1 is an overall schematic view of an outboard motor shift control system including a boat (hull), according to an embodiment of the invention and FIG. 2 is an enlarged side view of the outboard motor shown in FIG. 1.

In FIGS. 1 and 2, the symbol 10 indicates an outboard motor. The outboard motor 10 is mounted on the stem (transom) of a boat (hull) 12. As shown in FIG. 1, a steering wheel 16 is installed near a cockpit (the operator's seat) 14 of the boat 12. A steering wheel angle sensor 18 is installed near a rotary shaft (not shown) of the steering wheel 16 and produces an output or signal indicative of the steering angle (manipulated variable) of the steering wheel 16 manipulated by the operator.

A remote control box 20 is installed near the cockpit 14. The remote control box 20 is installed or provided with a lever 22. The lever 22 is free to be rotated fore and aft (toward and away from the operator) from the initial position, and is positioned to be manipulated by the operator to input an instruction to shift (change gears) or to regulate a speed of an internal combustion engine.

The remote control box 20 is equipped with a lever position sensor 24 that produces an output or signal corresponding to a position to which the lever 22 is manipulated by the operator. The outputs from the steering wheel angle sensor 18 and lever position sensor 24 are sent to an electronic control unit (hereinafter referred to as "ECU" or "current controller") 26 mounted on the outboard motor 10. The ECU 26 comprises a microcomputer.

As shown in FIG. 2, the outboard motor 10 is equipped with the internal combustion engine (now assigned with symbol 28; hereinafter referred to as "engine") at its upper portion. The engine 28 comprises a spark-ignition gasoline engine. The engine 28 is located above the water surface and covered by an engine cover 30. The ECU 26 is installed in the engine cover 30 at a location near the engine 28.

The outboard motor 10 is equipped at its lower portion with a propeller 32. The outputs of the engine 28 is transmitted to the propeller 32 through a shift mechanism (described below) and the like, such that the propeller 32 is rotated to generate thrust that propels the boat 12 in the forward and reverse directions.

The outboard motor 10 is further equipped with an electric steering motor (steering actuator) 34 that steers the outboard motor 10 to the right and left directions, an electric throttle motor (throttle actuator) 36 that opens and closes a throttle valve (not shown in FIG. 2) of the engine 28 and an electric shift motor (shift actuator; specifically a DC motor) 38 that operates the shift mechanism.

A steering angle sensor 40 is installed near the steering motor 34 and produces an output or signal in response to the steering angle of the outboard motor 10. A throttle position sensor 42 is disposed near the throttle motor 36 and produces an output or signal indicative of the opening of the throttle valve. Two shift position sensors 44, 46 and one neutral switch 48 are installed near the shift motor 38. The shift position sensors 44, 46 produce outputs or signals in response to the shift (gear) position (neutral, forward or reverse). The neutral switch 48 produces an ON signal when the neutral (shift) position is established and an OFF signal when the forward or reverse (shift) position is established.

A crank angle sensor 50 is installed near a crankshaft (not shown) of the engine 28 and produces an output or signal in response to the engine speed. The outputs of the aforesaid sensors and switch are sent to the ECU 26.

The ECU 26 permits to start the operation of the engine 28 only when the neutral switch 48 outputs the ON signal, i.e., when it is detected that the shift (gear) is at the neutral position, so as to prevent the boat 12 from moving at the engine start erroneously.

The ECU 26 controls the operation of the steering motor 34 based on the outputs of the steering wheel angle sensor 18 and steering angle sensor 40 so that the steering angle of the outboard motor 10 converges to a desired steering angle. The ECU 26 also changes or shifts the gear position, i.e., conducts the shift change by controlling the operation of the shift motor 38 based on the output of the lever position sensor 24 (more exactly, the manipulated direction of the lever 22). When the establishment of either the forward or reverse position is detected from the outputs of the shift position sensors 44, 46, the ECU 26 controls the operation of the throttle motor 36 based on the output of the lever position sensor 24 (more exactly, the magnitude of the manipulated variable of the lever 22) and the output of the throttle position sensor 42 so that the engine speed converges to a desired engine speed. The two shift position sensors 44, 46 are installed to deal with occurrence of failure or the like.

Figure 3:
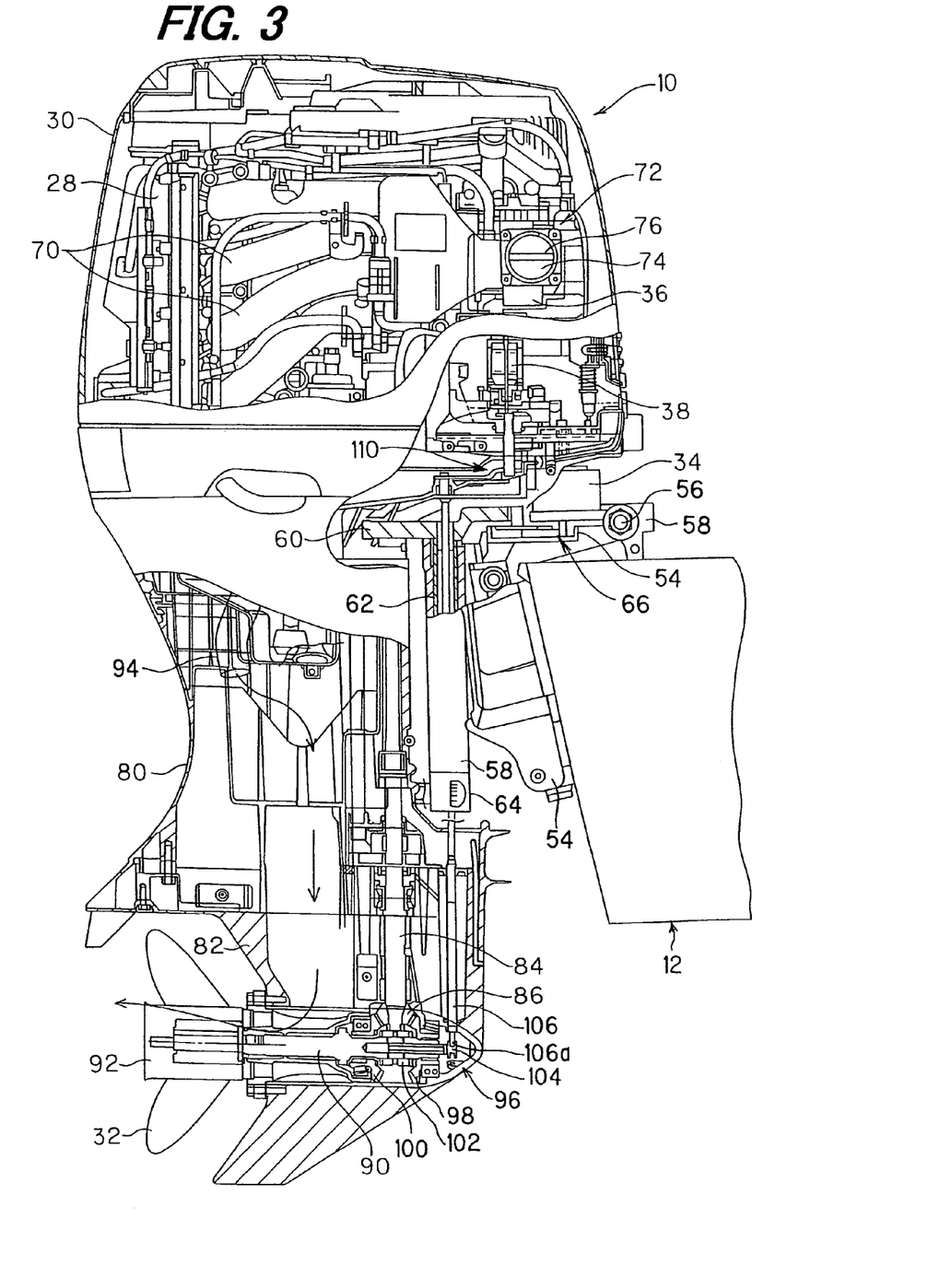
FIG. 3 is a partial sectional view of the outboard motor shown in FIG. 1.

The structure of the outboard motor 10 will then be described in detail with reference to FIG. 3. FIG. 3 is a partial sectional view of the outboard motor 10.

As shown in FIG. 3, the outboard motor 10 is equipped with stem brackets 54 fastened to the stem of the boat 12. A swivel case 58 is attached to the stem brackets 54 through a tilting shaft 56. The outboard motor 10 is also equipped with a mount frame 60 having a shaft 62. The shaft 62 is housed in the swivel case 58 to be freely rotated about a vertical axis. The upper end of the mount frame 60 is fastened to a frame of the outboard motor 10 and the lower end thereof is fastened to the frame of the outboard motor 10 through a lower mount center housing 64.

The upper portion of the swivel case 58 is installed with the steering motor 34. The output shaft of the steering motor 34 is connected to the mount frame 60 via a speed reduction gear mechanism 66. Specifically, a rotational output generated by driving the steering motor 34 is transmitted via the speed reduction gear mechanism 66 to the mount frame 60 such that the outboard motor 10 is steered about the shaft 62 as a rotational axis to the right and left directions (i.e., steered about the vertical axis).

The engine 28 has an intake pipe 70 that is connected to a throttle body 72. The throttle body 72 has a throttle valve 74 installed therein and the throttle motor 36 is integrally disposed thereto. The output shaft of the throttle motor 36 is connected via a speed reduction gear mechanism (not shown) installed near the throttle body 72 with a throttle shaft 76 that supports the throttle valve 74. Specifically, a rotational output generated by driving the throttle motor 36 is transmitted to the throttle shaft 76 to open and close the throttle valve 74, thereby regulating the flow rate of the air sucked in the engine 28 to change the engine speed.

An extension case 80 is installed at the lower portion of the engine cover 30 that covers the engine 28 and a gear case 82 is installed at the lower portion of the extension case 80. A drive shaft (vertical shaft) 84 is supported in the extension case 80 and gear case 82 to be freely rotated about the vertical axis. One end, i.e., the upper end of the drive shaft 84 is connected to the crankshaft (not shown) of the engine 28 and the other end, i.e., the lower end thereof is equipped with a pinion gear 86.

A propeller shaft 90 is supported in the gear case 82 to be freely rotated about the horizontal axis. One end of the propeller shaft 90 extends from the gear case 82 toward the rear of the outboard motor 10 and the propeller 32 is attached thereto, i.e., the one end of the propeller shaft 90, via a boss portion 92.

As indicated by the arrows in FIG. 3, the exhaust gas (combusted gas) emitted from the engine 28 is discharged from an exhaust pipe 94 into the extension case 80. The exhaust gas discharged into the extension case 80 further passes through the interior of the gear case 82 and the interior of the propeller boss portion 92 to be discharged into the water to the rear of the propeller 32.

The outboard motor 10 is also equipped with the shift mechanism (now assigned with symbol 96). The shift mechanism 96 comprises a forward bevel gear 98, reverse bevel gear 100, clutch 102, shift slider 104, shift rod 106 and speed reduction gear mechanism 110. The forward bevel gear 98 and reverse bevel gear 100 are disposed onto the outer periphery of the propeller shaft 90 to be rotatable in opposite directions by engagement with the pinion gear 86. The clutch 102 is installed between the forward bevel gear 98 and reverse bevel gear 100 and rotates integrally with the propeller shaft 90.

The shift rod 106 penetrates from the upper portion to lower portion of the interior of the outboard motor 10. Specifically, the shift rod 106 is supported to be freely rotated about the vertical axis in a space from the engine cover 30, passing through the swivel case 58 (more specifically the interior of the shaft 62 accommodated therein), to the gear case 82. The clutch 102 is connected via the shift slider 104 to a rod pin 106*a* disposed on the bottom of the shift rod 106.

The rod pin 106*a* is formed at a location offset from the center of the bottom of the shift rod 106 by a predetermined distance. As a result, rotation of the shift rod 106 causes the rod pin 106*a* to move while describing an arcuate locus whose radius is the predetermined distance (offset amount).

The movement of the rod pin 106*a* is transferred through the shift slider 104 to the clutch 102 as displacement parallel to the axial direction of the propeller shaft 90. As a result, the clutch 102 is slid to a position where it engages one or the other of the forward bevel gear 98 and reverse bevel gear 100 or to a position where it engages neither of them.

When the clutch 102 is engaged with the forward bevel gear 98 (the forward (shift) position is established), the rotation of the drive shaft 84 is transmitted through the pinion gear 86 and forward bevel gear 98 to the propeller shaft 90, thereby rotating the propeller 32 to produce thrust in the direction of propelling the boat 12 forward.

When the clutch 102 is engaged with the reverse bevel gear 100 (the reverse (shift) position is established), the rotation of the drive shaft 84 is transmitted through the pinion gear 86 and reverse bevel gear 100 to the propeller shaft 90, thereby rotating the propeller 32 in the direction opposite from that during forward travel to produce thrust in the direction of propelling the boat 12 rearward.

When the clutch 102 is not engaged with either the forward bevel gear 98 or the reverse bevel gear 100 (the neutral (shift) position is established), the transmission of the rotation of the drive shaft 84 to the propeller shaft 90 is cut off.

The explanation of FIG. 3 will be resumed. The shift motor 38 is installed inside the engine cover 30 and its output shaft is connected to the upper end of the shift rod 106 through the speed reduction gear mechanism 110. Therefore, when the shift motor 38 is driven, its rotational output is transmitted to the shift rod 106 through the speed reduction gear mechanism 110, thereby rotating the shift rod 106. The clutch 102 is slid in response to the rotation of the shift rod 106 to select a gear position from among the foregoing forward, neutral and reverse positions.

Figure 4:
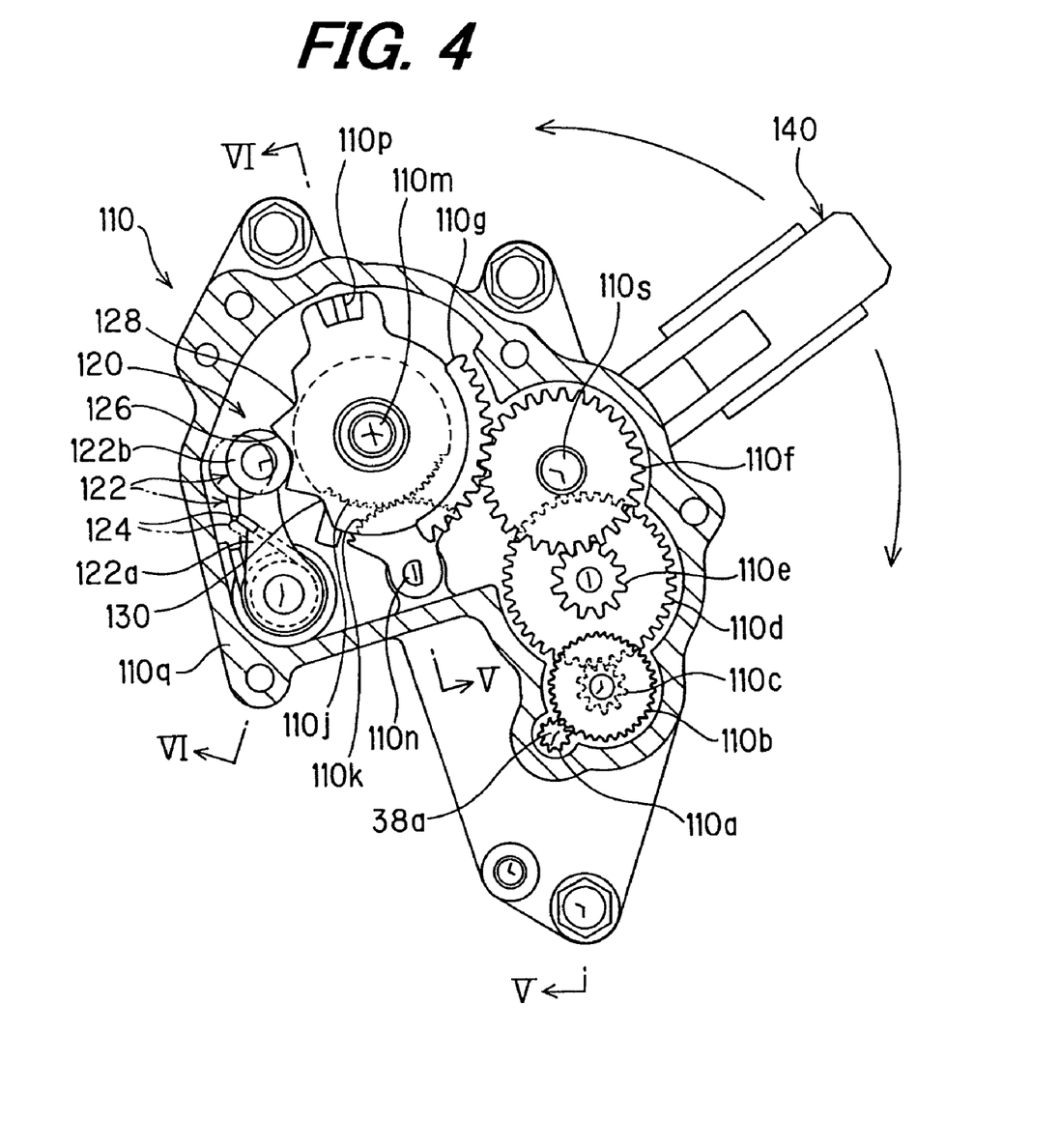
FIG. 4 is an enlarged sectional view of a speed reduction gear mechanism shown in FIG. 3.
Figure 5:
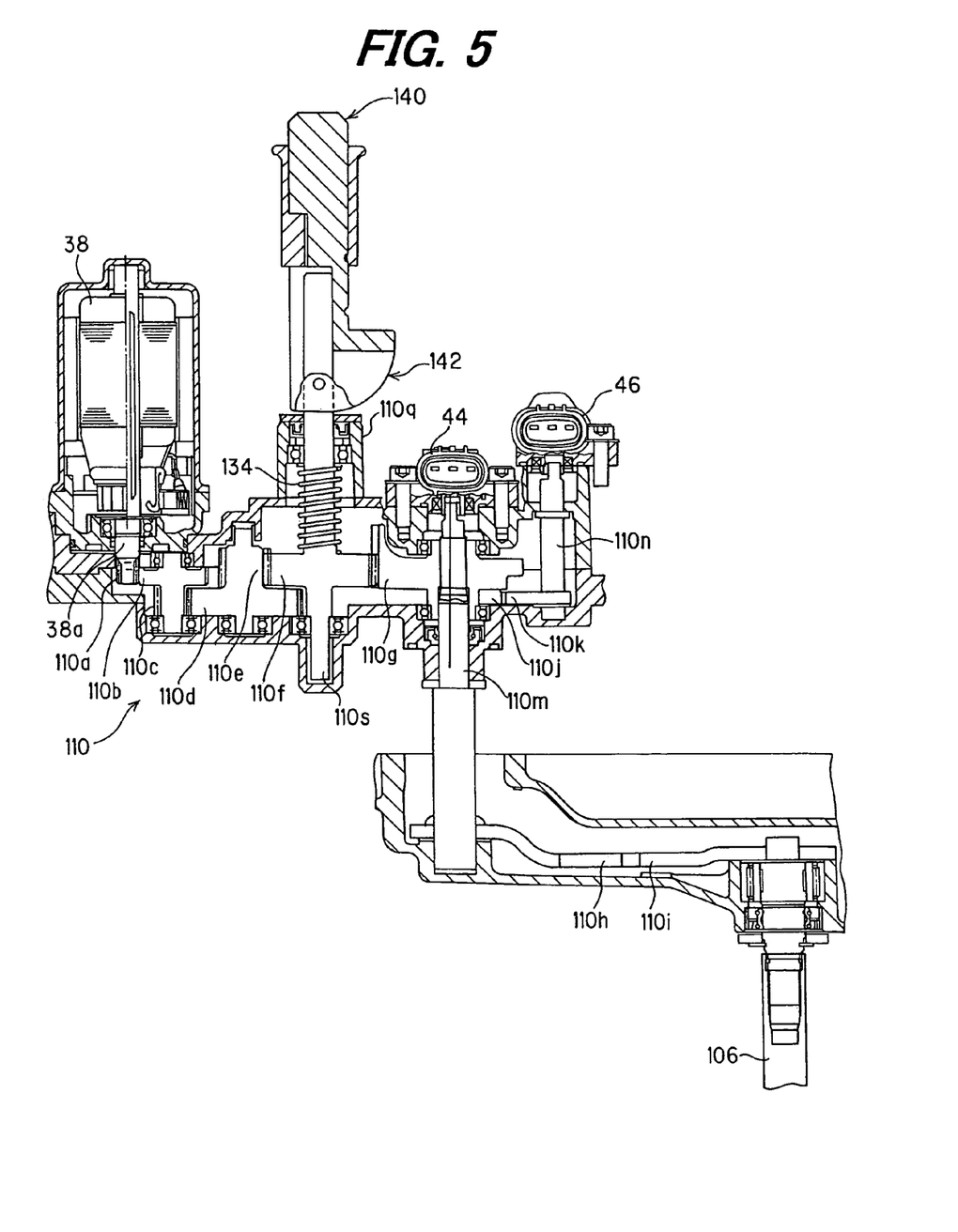
FIG. 5 is a sectional view taken along line V-V shown in FIG. 4.

FIG. 4 is an enlarged sectional view of the speed reduction gear mechanism shown in FIG. 3. FIG. 5 is a sectional view taken along line V-V in FIG. 4.

As shown in FIGS. 4 and 5, the output shaft 38a of the shift motor 38 is connected to the upper end of the shift rod 106 through the speed reduction gear mechanism 110. The speed reduction gear mechanism 110 comprises eleven gears, all of which are external gears.

A first gear 110a is provided on the shift motor output shaft 38a and meshes with a second gear 110b of larger diameter. A third gear 110c, which is smaller in diameter than the second gear 110b, is provided on the same shaft as the second gear 110b and meshes with a fourth gear 110d of larger diameter. A fifth gear 110e, which is smaller in diameter than the fourth gear 110d, is provided on the same shaft as the fourth gear 110d and meshes with a sixth gear 110f of larger diameter. The sixth gear 110f meshes with a seventh gear 110g of larger diameter.

The gears up to the seventh gear 110g reduce the rotation of the shift motor 38 to a rotation angle of less than 180 degrees (around 110 degrees) at the seventh gear 110g. Therefore, as shown in FIG. 4, teeth are formed on only part of the periphery of the seventh gear 110g (so that the arc along which the teeth are continuously formed is the inferior arc).

An eighth gear 110h is provided on the same shaft as the seventh gear 110g. The eighth gear 110h meshes with a ninth gear 110i, which is provided on the upper end of the shift rod 106. The output of the shift motor 38 is therefore transmitted to the shift rod 106 through the first gear 110a to ninth gear 110i at reduced rpm and increased torque A tenth gear 110j is also provided on the same shaft as the seventh gear 110g. The tenth gear 110j meshes with an eleventh gear 110k.

The aforesaid shift position sensor 44 is attached to the rotary shaft 110m of the seventh gear 110g. The shift position sensor 44 produces an output indicative of the rotation angle of the rotary shaft 110m as the shift position signal. In addition, the shift position sensor 46 is attached to the rotary shaft 110n of the eleventh gear 110k. The shift position sensor 46 produces an output indicative of the rotation angle of the rotary shaft 110n as the shift position signal.

FIGS. 4 and 5 show the speed reduction gear mechanism 110 with the shift position established to neutral. In this embodiment, the output shaft 38a of the shift motor rotates counterclockwise when the shift position is changed from neutral to forward, as viewed in FIG. 4, and rotates clockwise when it is changed from neutral to reverse.

Figure 6:
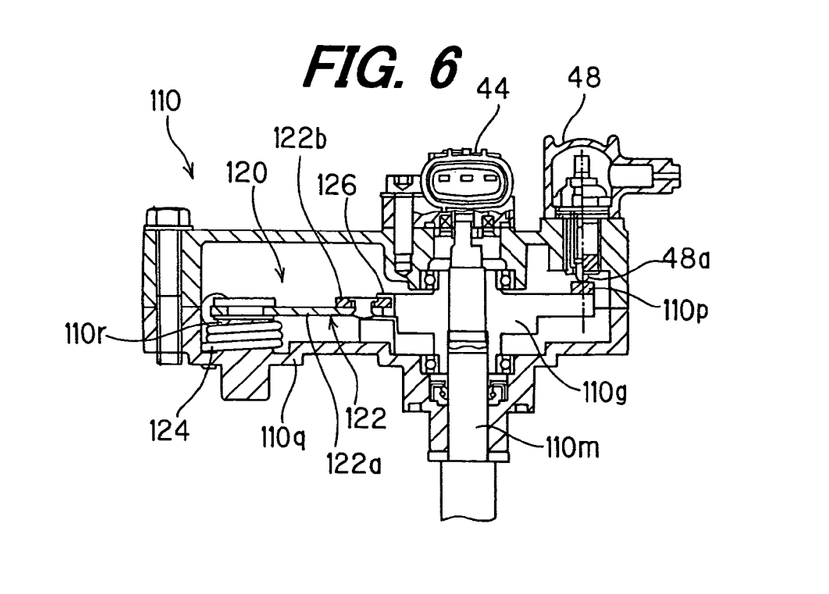
FIG. 6 is a sectional view taken along line VI-VI shown in FIG. 4.

FIG. 6 is a sectional view taken along line VI-VI in FIG. 4.

As shown in FIG. 6, the aforesaid neutral switch 48 is located above the seventh gear 110g. The neutral switch 48 is equipped with a detection member 48a. As shown in FIGS. 4 and 6, a protrusion 110p rising from the upper surface of the seventh gear 110g makes contact with the detection member 48a when the neutral position is established. When the protrusion 110p makes contact with the detection member 48a, the neutral switch 48 outputs an ON signal.

The speed reduction gear mechanism 110 is equipped with a detent mechanism (shift position holder) 120. Once a shift position has been changed or established, the detent mechanism 120 holds the changed position. The detent mechanism 120 comprises a rotary member rotated by the output of the shift motor 38, the role of which is played by the seventh gear 110g, a contact member 122 that is located near and makes contact with the seventh gear 110g, a coil spring (urging member) 124 for urging the contact member 122 onto the seventh gear 110g, and indentations 126, 128, 130 formed in the seventh gear 110g.

The detent mechanism 120 will be explained. The contact member 122 comprises a lever 122a and a round portion 122b. A casing 110q of the speed reduction gear mechanism 110 is provided with a cylindrical projection 110r extending parallel to the axial direction of the rotary shaft 110m of the seventh gear 110g. One end of the lever 122a is connected to the projection 110r. The lever 122a is swingable about its end connected to the projection 110r and thus about an axis lying parallel to the rotary shaft 110m. In addition, its other end is biased toward the seventh gear 110g by the coil spring 124.

The other (distal) end of the lever 122a is attached to the round portion 122b. The periphery of the round portion 122b makes contact with the portion of the periphery of the seventh gear 110g that is not formed with teeth. The portion of the periphery of the seventh gear 110g not formed with teeth (the portion contacted by the round portion 122b) is formed with the three indentations 126, 128, 130, i.e., with a number of indentations equal to the number of shift positions. The round portion 122b engages the one of the three indentations 126, 128, 130 that is associated with the current shift position.

Specifically, as shown in FIG. 4, when the neutral position is established, the urging force of the coil spring 124 presses the round portion 122b into engagement with the indentation 126. As a result, the operation of the shift mechanism 96 is constrained and the neutral position securely held.

Figure 7:
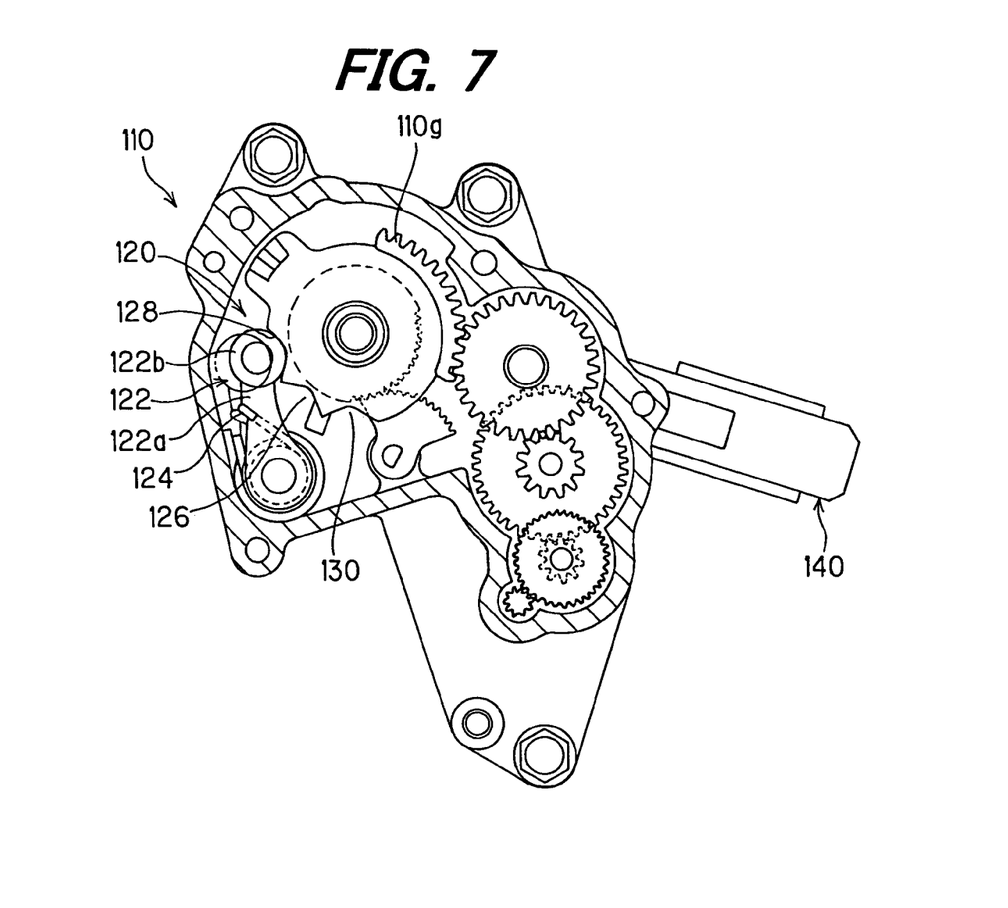
FIG. 7 is a sectional view similar to FIG. 4.

When the shift motor 38 is operated to establish the forward position (when the output shaft 38a is turned counterclockwise as viewed in FIG. 4), the seventh gear 110g rotates counterclockwise, so that the round portion 122b engages the indentation 128 formed upward of the indentation 126 in the drawing sheet (see FIG. 7). As a result, the operation of the shift mechanism 96 is constrained and the forward position is securely held. When the shift motor 38 is operated to establish the reverse position (when the output shaft 38a is turned clockwise as viewed in FIG. 4), the seventh gear 110g rotates clockwise, so that the round portion 122b engages the indentation 130 formed downward of the indentation 126 in the drawing sheet (see FIG. 8). As a result, the operation of the shift mechanism 96 is constrained and the reverse position is securely held.

The explanation of FIG. 5 will be continued. The sixth gear 110f is slidable in the tooth facewidth direction together with its rotary shaft 110s. The sixth gear 110f is hereinafter referred to as a "sliding gear."

As shown in FIG. 5, the gears on the upstream and downstream sides of the sliding gear 110f in the output transmission train of the speed reduction gear mechanism 110 (the train from the first gear 110a to ninth gear 110i), i.e., the fifth gear 110e and seventh gear 110g, are different in facewidth. Namely, the facewidth of the seventh gear 110g is larger than that of the fifth gear 110e and the difference (extra facewidth) extends upward from the level of the top surface of the fifth gear 110e. The sliding gear 110f is urged downward by a spring 134. That is, it is urged or biased in the direction of meshing with both the fifth gear 110e and the seventh gear 110g.

The upper segment of the rotary shaft 110s of the sliding gear 110f projects upward beyond the casing 110q, and a manual lever 140 is attached to the portion rising above the casing 110q. The lower end of the manual lever 140 is formed with a cam 142 that rides on the casing 110q. The manual lever 140 is positioned so that it can be readily manipulated by the boat operator.

Figure 8:
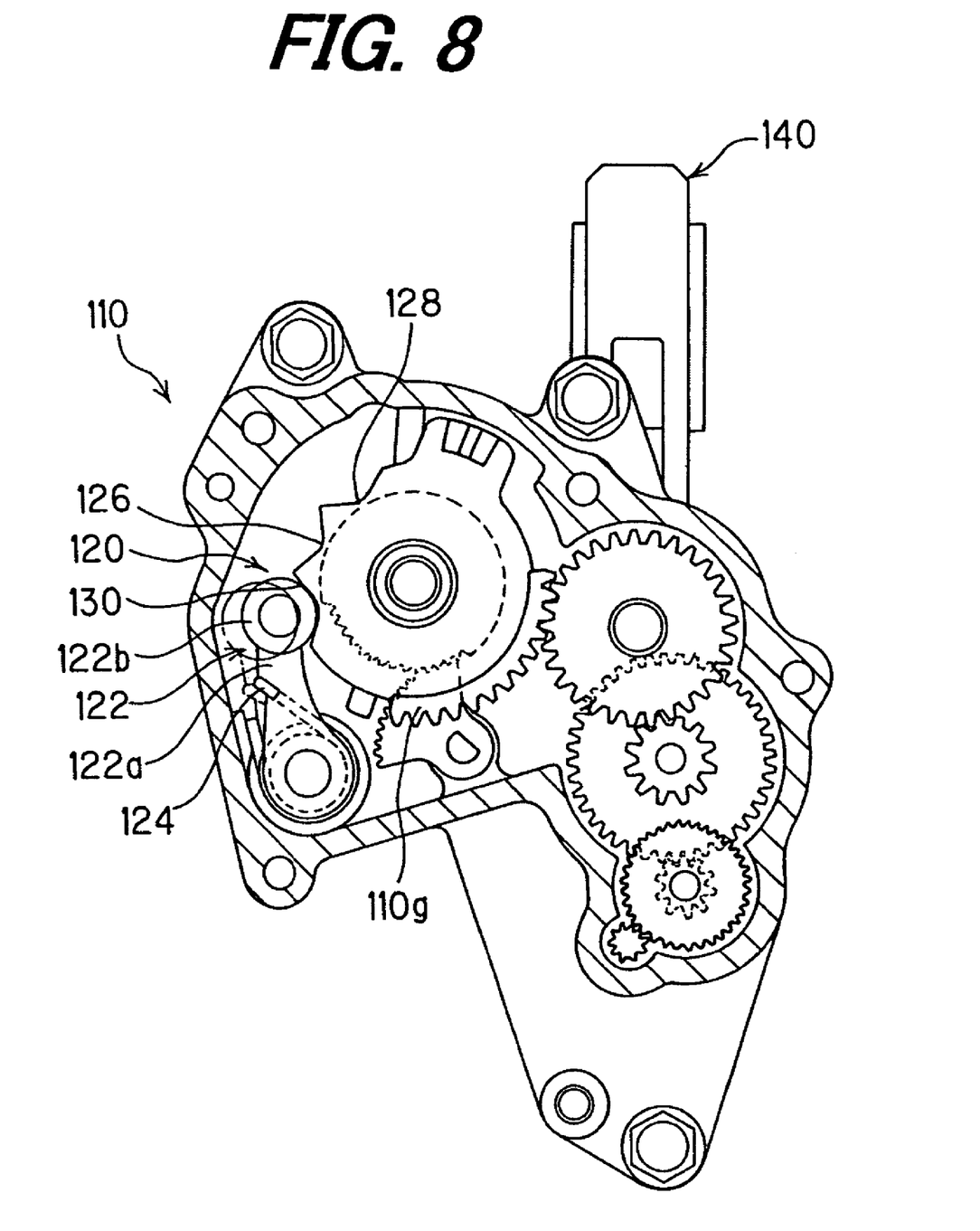
FIG. 8 is a sectional view similar to FIG. 4.
Figure 9:
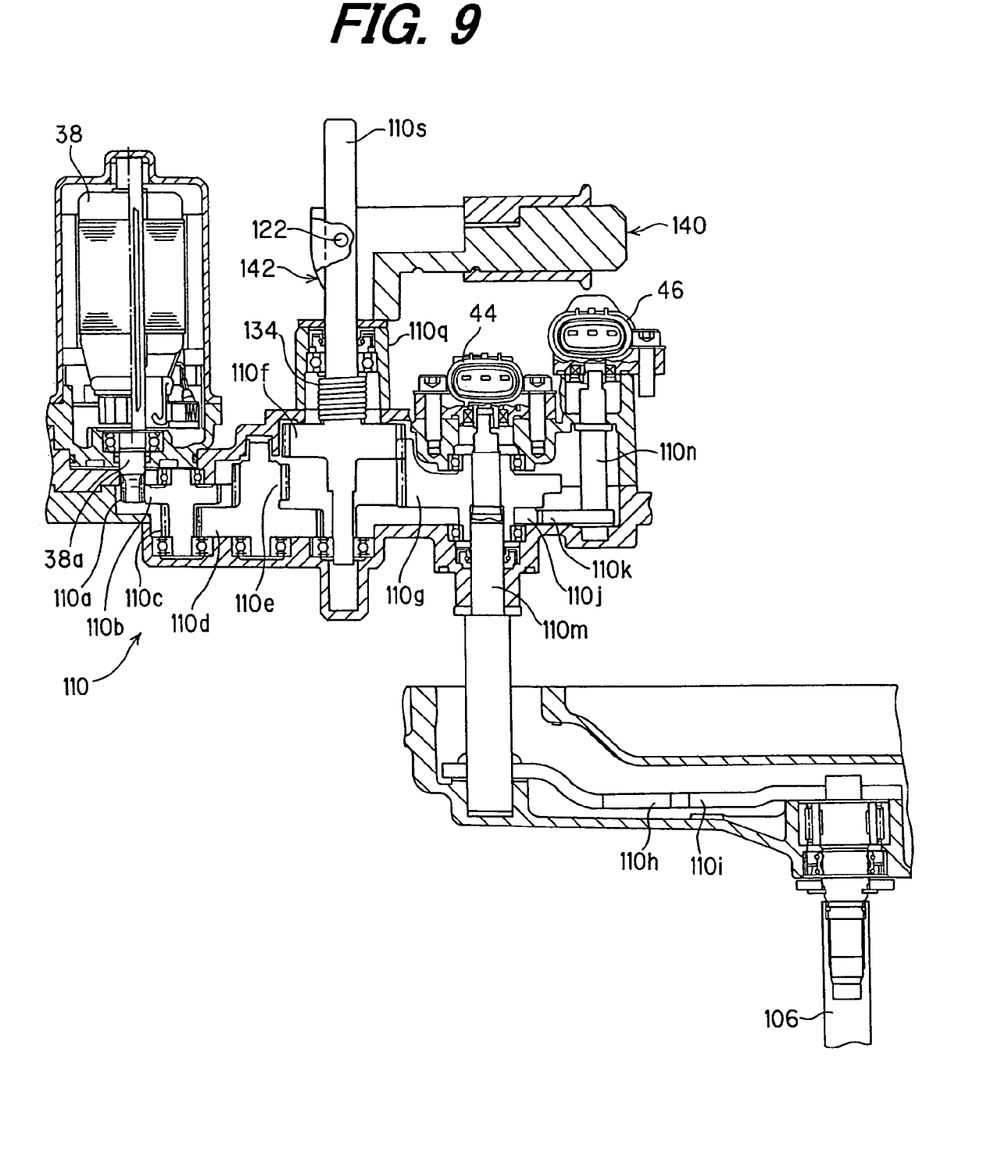
FIG. 9 is a sectional view similar to FIG. 5.

As shown in FIG. 9, the manual lever 140 can be tilted to make an angle of 90 degrees with the rotary shaft 110s. In FIGS. 4, 7 and 8 explained above, the manual lever 140 is shown in the tilted orientation. When the manual lever 140 is tilted, the action of the cam 142 slides the rotary shaft 110s and sliding gear 110f upward to release the engagement between the sliding gear 110f and the fifth gear 110e. This means that the output transmission train of the speed reduction gear mechanism 110 is broken between the sliding gear 110f and the fifth gear 110e upstream thereof.

Since the seventh gear 110g is given a larger facewidth than that of the fifth gear 110e, the sliding gear 110f and seventh gear 110g stay meshed after the sliding gear 110f is slid upward. Therefore, if the shift motor 38 should fail or malfunction, the shift position can still be changed manually by tilting the manual lever 140 and producing the rotations shown in FIGS. 7 and 8.

The operation of the shift control system according to the embodiment will now be explained.

Figure 10:
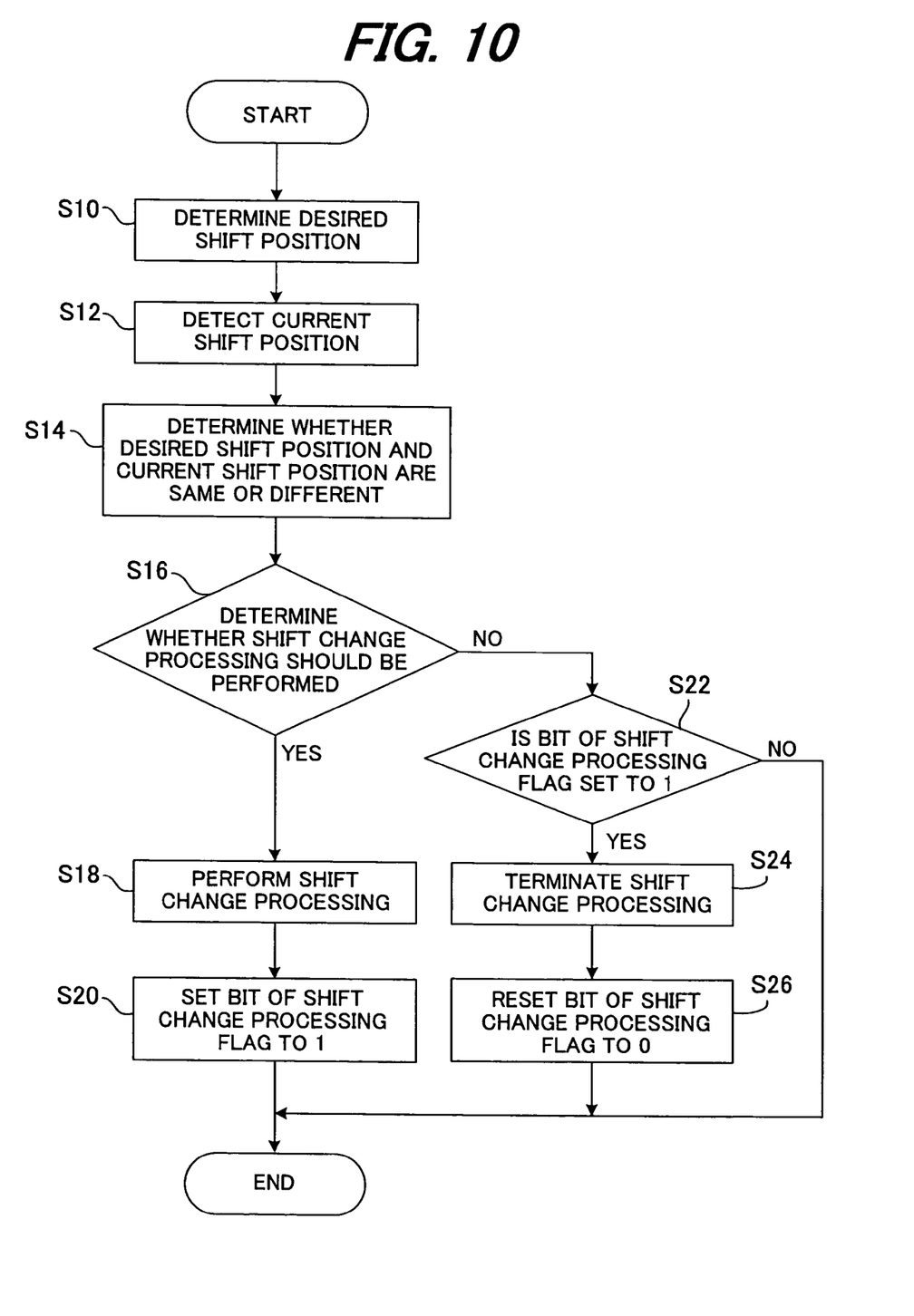
FIG. 10 is a flowchart showing the operation for controlling an electric shift motor shown in FIG. 2.

FIG. 10 is a flowchart showing the operation of the system. The illustrated routine is executed in the ECU 26 at predetermined intervals (e.g., every 10 milliseconds).

First, in S10, a desired shift position is determined based on the output of the lever position detector 24. Next, in S12, the current or present shift position is detected. This processing is performed based on the outputs of the shift position sensors 44, 46 and the neutral switch 48.

Next, in S14, it is determined whether the desired shift position determined in S10 and the current shift position detected in S12 are the same or different. When they are different, it is determined that the shift change processing should be executed, and when they are the same, i.e., the desired shift position is established, it is determined that the shift change processing should not be executed. It is worth noting here that additional conditions can also be set in S14, such as that the processing should not be executed if the engine speed is higher than a predetermined level.

Next, in S16, it is determined whether or not the shift change processing should be executed based on the determination in S14. When the result in S16 is YES, the program goes to S18, in which the shift change processing is performed. Specifically, the supply of current to the shift motor 38 is controlled to operate the shift mechanism 96 so as to change shift, i.e., to make the shift position equal to the desired shift position. Next, in S20, the bit of a shift change processing flag is set to 1 (initially 0). To set the bit of this flag to 1 indicates that the desired shift position is established.

When the result in S16 is NO, the program goes to S22, in which it is determined whether the bit of the shift change processing flag is set to 1. When the result in S22 is YES, i.e., when the desired shift position was established by the shift change processing performed in the preceding cycle or successively from still earlier cycles, the program goes to S24, in which the shift change processing is terminated. Specifically, the supply of current to the shift motor 38 is discontinued or cut off. Even after the supply of current to the shift motor 38 is discontinued, the established shift position, i.e., the desired shift position is securely held because operation of the shift mechanism 96 is constrained by the detent mechanism 120.

Next, in S26, the bit of the shift change processing flag is reset to 0. When the result in S22 is NO, i.e., when the shift change processing was not performed in the preceding cycle or successively from still earlier cycles, S24 and S26 are skipped.

As explained in the foregoing, the outboard motor shift control system according to this preferred embodiment changes the shift position by controlling the supply of current to the shift motor 38 for driving the shift mechanism 96, is equipped with the detent mechanism 120 for constraining the operation of the shift mechanism 96 and holding the shift position once the shift position has been established, and discontinues or cuts off supply of current to the shift motor 38 upon detection that the shift position has been established. This configuration makes it possible to minimize the power consumption of the shift motor 38 and ensure secure holding of the established shift position.

Moreover, the detent mechanism 120 is configured to comprise the seventh gear 110g rotated by the output of the shift motor 38, the contact member 122 located near and making contact with the seventh gear 110g, the coil spring 124 for urging the contact member 122 onto the seventh gear 110g, and the indentations 126, 128, 130 formed in the seventh gear 110g for engaging the contact member 122 when the shift position has been changed or established. Owing to this configuration, the detent mechanism 120 can be made simple and compact so as to minimize increase in cost and installation space.

Even when engagement between the fifth gear 110e and sliding gear 110f is released to enable manual shift change, the detent mechanism 120 still constrains the operation of the components between the seventh gear 110g and the clutch 120 so that the shift position holding function remains in effect. The burden on the operator during manual manipulation is therefore lightened.

The embodiment is thus configured to have a system for controlling shift change of an outboard motor (10) mounted on a stem of a boat (12) among positions including a forward position, a reverse position and a neutral position, comprising: an electric actuator (shift motor 38) driving a shift mechanism (96) of the outboard motor that changes the shift position; a current controller (ECU 26, S18) controlling supply of current to the actuator to operate the shift mechanism; a shift position holder (detent mechanism 120) holding the shift position once established; and a detector (shift position sensors 44, 46; neutral switch 48) detecting whether one of the shift positions has been established; wherein the current controller discontinues the supply of current to the actuator when it is detected that the shift position has been established (S24).

In the system, the shift mechanism includes a shift rod (106) and the shift position holder comprises: a rotating member (seventh gear 110g) connected to the shift rod and rotated by the actuator; a contact member (122) located to make contact with the rotating member; an urging member (coil spring 124) urging the contact member onto the rotating member; and indentations (126, 128, 1390) formed in the rotating member and engage the contact member when the shift position is changed.

In the system, the indentations are formed to be in a same number (3) as that of the shift positions, such that the contact member (122) engages one of the indentations (126, 128, 130) that is associated with the changed shift position.

In the system, the contact member (122) comprises a lever (122a) urged by the urging member onto the rotating member and a round portion (122b) attached to an end of the lever to be contact with the rotating member such that the round portion engages the one of the indentations (126, 128, 130) that is associated with the changed shift position.

In the system, the rotating member comprises a gear (110g) and the urging member comprises a spring (coil spring 124).

Although the electric actuator for driving the shift mechanism 96 is exemplified as a motor in the foregoing, any of various other types of actuators operated by electric power can be adopted instead.

Although it is explained that the indentations 126, 128, 130 for engaging the contact member 122 are formed in the seventh gear 110g constituting a part of the output transmission train of the shift motor 38, these indentations can instead be formed in a rotary member separately provided on the rotary shaft 110m, for example, as a member outside the output transmission train.

Japanese Patent Application No. 2005-081113 filed on Mar. 22, 2005 is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for controlling shift change of an outboard motor mounted on a stem of a boat among positions including a forward position, a reverse position and a neutral position, comprising:
    an electric actuator driving a shift mechanism of the outboard motor that changes the shift position;
    a current controller controlling supply of current to the actuator to operate the shift mechanism;
    a shift position holder holding the shift position once established; and
    a detector detecting whether one of the shift positions has been established;
    wherein the current controller discontinues the supply of current to the actuator when it is detected that the shift position has been established.

2. The system according to claim 1, wherein the shift mechanism includes a shift rod and the shift position holder comprises:
    a rotating member connected to the shift rod and rotated by the actuator;
    a contact member located to make contact with the rotating member;
    an urging member urging the contact member onto the rotating member; and
    indentations formed in the rotating member to engage the contact member when the shift position is changed.

3. The system according to claim 2, wherein the indentations are formed to be in a same number as that of the shift positions, such that the contact member engages one of the indentations that is associated with the changed shift position.

4. The system according to claim 3, wherein the contact member comprises a lever urged by the urging member onto the rotating member and a round portion attached to an end of the lever to be contact with the rotating member such that the round portion engages the one of the indentations that is associated with the changed shift position.

5. The system according to claim 2, wherein the rotating member comprises a gear and the urging member comprises a spring.

* * * * *